(12) United States Patent
Hackel et al.

(10) Patent No.: US 6,700,906 B2
(45) Date of Patent: Mar. 2, 2004

(54) HIGH ENERGY, HIGH AVERAGE POWER SOLID STATE GREEN OR UV LASER

(75) Inventors: Lloyd A. Hackel, Livermore, CA (US); Mary Norton, Livermore, CA (US); C. Brent Dane, Livermore, CA (US)

(73) Assignee: The Regents of the University of California, Oakland, CA (US)

( * ) Notice: Subject to any disclaimer, the term of this patent is extended or adjusted under 35 U.S.C. 154(b) by 6 days.

(21) Appl. No.: 10/062,315

(22) Filed: Jan. 31, 2002

(65) Prior Publication Data

US 2003/0142705 A1 Jul. 31, 2003

(51) Int. Cl.[7] .............................................. H01S 3/10
(52) U.S. Cl. ........................................ 372/22; 372/26
(58) Field of Search ............................. 372/22, 23, 26

(56) References Cited

U.S. PATENT DOCUMENTS

| 4,331,891 A | * | 5/1982 | Rizzo ........................ 359/329 |
| 4,346,314 A | * | 8/1982 | Craxton ..................... 359/329 |
| 5,144,630 A | * | 9/1992 | Lin ............................. 372/22 |
| 5,151,909 A | * | 9/1992 | Davenport et al. ........... 372/22 |
| 5,159,602 A | | 10/1992 | Giordano et al. |
| 5,239,408 A | * | 8/1993 | Hackel et al. ............... 359/338 |
| 5,260,954 A | * | 11/1993 | Dane et al. .................. 372/25 |
| 5,285,310 A | * | 2/1994 | Miller et al. ................ 359/338 |
| 5,523,262 A | | 6/1996 | Fair et al. |
| 5,640,406 A | * | 6/1997 | Injeyan et al. ................ 372/33 |
| 5,689,363 A | * | 11/1997 | Dane et al. .................. 359/334 |
| 5,745,284 A | * | 4/1998 | Goldberg et al. ............ 359/344 |
| 5,893,952 A | | 4/1999 | Aronowitz et al. |
| 5,940,418 A | * | 8/1999 | Shields ........................ 372/22 |
| 5,949,395 A | | 9/1999 | Stevens et al. |
| 6,172,996 B1 | | 1/2001 | Partanen et al. |
| 6,178,035 B1 | * | 1/2001 | Eda et al. .................... 359/326 |

FOREIGN PATENT DOCUMENTS

| EP | 000652616 A1 | * | 9/1994 | ............ H01S/3/23 |
| WO | WO 99/04317 | | 1/1999 | |

* cited by examiner

Primary Examiner—Paul Ip
Assistant Examiner—Tuan Nguyen
(74) Attorney, Agent, or Firm—Eddie E. Scott; Alan H. Thompson

(57) ABSTRACT

A system for producing a green or UV output beam for illuminating a large area with relatively high beam fluence. A Nd:glass laser produces a near-infrared output by means of an oscillator that generates a high quality but low power output and then multi-pass through and amplification in a zig-zag slab amplifier and wavefront correction in a phase conjugator at the midway point of the multi-pass amplification. The green or UV output is generated by means of conversion crystals that follow final propagation through the zig-zag slab amplifier.

34 Claims, 6 Drawing Sheets

HIGH ENERGY, HIGH AVERAGE POWER SOLID STATE GREEN OR UV LASER

The United States Government has rights in this invention pursuant to Contract No. W-7405-ENG-48 between the United States Department of Energy and the University of California for the operation of Lawrence Livermore National Laboratory.

BACKGROUND

1. Field of Endeavor

The present invention relates to solid state laser systems, and more particularly to the operation of a solid state system that produces a high energy, high average power green or UV laser.

2. State of Technology

U.S. Pat. No. 5,523,262 for rapid thermal annealing using thermally conductive overcoat by Jim Fair and John Mehlhaff, assigned to Intevac, Inc., patented Jun. 4, 1996, provides the following description, "Rapid thermal processing (RTP) is known in the prior art as a way to anneal semiconductor wafers and other substrates in order to crystallize amorphous Si films and activate doped Si films. For example see, R. Kakkad, et al., "Crystallized Si Films by Low-temperature Rapid Thermal Annealing of Amorphous Silicon," J. Appl. Phys. 65 (5), Mar. 1, 1989. Rapid thermal annealing is a process of heating semiconductor devices quickly, where the anneal time is on the order of 5 seconds. Very rapid thermal processing (VRTP) is a process where the substrate surface is heated to 1000° C. in less than 0.5 seconds. VRTP is also known in the art. For example see, "Rapid Thermal Processing: How Well Is It Doing and Where Is It Going?," Mat. Res. Soc. Symp. Proc. 92, 3 (1987). One use of RTP and VRTP is solid phase recrystallization (SPC). Prior to SPC, a substrate will have on it one or more overlapping deposited silicon films which do not have a defined crystalline structure. Such silicon films are called amorphous silicon (a-Si). Heating an a-Si film to a sufficiently high temperature transforms it into a crystallized, or polysilicon, film. Another use of RTP and VRTP is to integrate doped impurities into the crystal structure of a doped polysilicon film. The heat of RTP activates the impurities in the film, and increases the conductivity of the film. In a typical substrate processing operation, several films containing patterns of circuit elements are grown on or etched from the substrate, and then selected areas of the patterned films on the substrate are doped with impurities. The substrate is then heated and cooled, thus activating the doped regions. Both a-Si films and polysilicon films can be heated effectively by exposing them to radiated light energy from a xenon arc lamp, however a-Si films generally absorb more energy in the range emitted by xenon lamps than do polysilicon films. The ability of these thin (250–2500 angstrom) films to absorb radiated energy is dependent on the thickness of the film, the amount of crystalline structure in the film, and the impurity content of the film. In general greater absorption, and therefore quicker heating, occurs in thicker films, which are more opaque to the radiated energy. The temperature reached in an exposed film is not only a function of the absorbed energy, but also a function of the rate of heat loss by conduction to the structure underlying the film. This underlying structure is made up of the substrate and any previously processed layers. The term "layer" is used herein interchangeably with the term "film", however "layers" better describes a substrate where many films are laid one on top of the other. The rate of heat loss from a film is a function of the temperature difference between the film and its underlying structure, the heat capacity of the film, and the geometry of the boundary between the film and the underlying structure. As an example of the effect of geometry on heat loss, in a film containing an etched pattern of circuit elements, smaller features of the pattern will dissipate proportionally more heat to a cold substrate than a larger feature in a film of the same thickness. This is because a feature can dissipate heat into parts of the structure lying beyond the edges of the feature as well as into the structure directly under the feature, and a smaller structure has a larger edge-to-area ratio, giving it a higher heat transfer coupling to the underlying structure. Heat conductivity is also a function of the heat capacity of the underlying structure. Thus, if a film to be annealed is overlying a film which acts as a thermal insulator, the film being annealed will cool slower than if the film is in direct contact with a thermally conductive substrate. These unavoidable variations in radiant energy absorption and heat dissipation lead to a common problem associated with annealing a patterned substrate, namely uneven heating of an uneven film surface. Larger features, as compared with smaller features, will absorb proportionally more radiated energy, since the cross section exposed to the xenon lamp is greater, and larger features conduct heat less efficiently to the surface of the substrate. Thus, larger features tend to overheat as smaller features are heated to annealing temperatures. The overheating problem also arises when trying to uniformly heat thick, multilayer features. A thin feature is exposed to as much radiated energy as a thick feature of the same area, consequently a thick feature will heat faster due to increased opacity and less thermal coupling per unit mass to the underlying structure. Another disadvantage of radiant heating, in addition to the inability to create uniform temperatures, is that a film to be annealed must be uppermost on the substrate, where it is able to absorb the radiant energy. To meet this requirement, many annealing steps must occur in the production process, each before the layer to be annealed is covered by other layers. For example, in a typical thin film transistor (TFT) process, SPC would occur in the early stages of the process, when the layer to be recrystallized is uppermost, and implant activation would occur in the later stages of the process, when the implanted layer is uppermost. Radiant heating of thin film structures on glass substrates presents additional difficulties. Typical substrate glasses cannot withstand extended exposure to temperatures above the glass strain point (usually in the range of 575° C. to 650° C.). Because crystallization of a-Si films and implant activation by RTP or VRTP may require heat treatment above the glass strain point, damage to the glass substrate may occur because exposure times are too long at the power density levels typically available to RTP/VRTP (10–5000 W/cm2). To solve the problem of uneven temperatures, the substrate can be annealed in a convection furnace. However, this method also has its drawbacks. Furnace heating takes longer, and as 8 inch wafers become more common over 4 inch wafers, end-wafer heating problems will become more problematic. End-substrate heating problems also arise where the substrate is a glass substrate for a flat panel display, which can measure 8 inches across for a single device. Also, since the entire furnace chamber must be heated to the annealing temperature, the walls of the chamber are more likely to give off contaminants. The substrate can be heated using a pinpoint laser scanning in two dimensions and adjusting the intensity of the beam to compensate for the variations in energy absorption and heat dissipation.

However, for this approach to work properly, the intensity control of the laser must be closely aligned with the features on the substrate, which becomes increasingly complicated as feature size decreases. Laser annealing is also undesirable because of the high power densities required and the tendency for the large temperature gradients caused by spot scanning to damage substrates."

U.S. Pat. No. 4,346,314 for a high power efficient frequency conversion of coherent radiation with nonlinear optical elements by Robert S. Craxton, assigned to the University of Rochester, patented Aug. 24, 1982, provides the following description, "The invention is especially suitable in tripling the frequency of high power laser beams having large apertures, such as the approximately 1.06 micrometer output from a neodymium glass (Nd:glass) laser which may result in increased absorption and increased neutron production by a material containing fusion fuel when irradiated by the tripled high power beam at approximately 0.35 micrometer. Nonlinear optical elements such as birefringent crystals have been used for converting the frequency of laser beams. The interaction of the beams in such elements have been studied and the principles of such interactions described at length in a paper entitled, Interactions between Light Waves in a Nonlinear Dielectric, by J. A. Armstrong, N. Bloembergen, J. Ducuing and P. S. Pershan, Physical Review, Volume 127, Number 6, (1918–1939), 1962. The authors of this paper noted certain energy transfer relationships in the nonlinear elements, which result in reconversion of the harmonic frequency components back into fundamental frequency components in the elements. This is a function of the relative optical energy (numbers of photons) of the harmonic and fundamental components in the nonlinear element. The energy in the optical element depends upon the intensity of the input laser beams passing through the element. Such beams in practice have nonconstant temporal shapes and sometimes non-uniform spatial profiles. Even when the nonlinear elements are arranged for optimum phase matching the energy relationships and realistic laser beams give rise to reconversion and loss of efficiency."

U.S. Pat. No. 5,239,408 for a high power, high beam quality regenerative amplifier by Lloyd A. Hackel and Clifford B. Dane, patented Aug. 24, 1993 provides the following description, "A regenerative laser amplifier system generates high peak power and high energy per pulse output beams enabling generation of X-rays used in X-ray lithography for manufacturing integrated circuits. The laser amplifier includes a ring shaped optical path with a limited number of components including a polarizer, a passive 90 degree phase rotator, a plurality of mirrors, a relay telescope, and a gain medium, the components being placed close to the image plane of the relay telescope to reduce diffraction or phase perturbations in order to limit high peak intensity spiking. In the ring, the beam makes two passes through the gain medium for each transit of the optical path to increase the amplifier gain to loss ratio. A beam input into the ring makes two passes around the ring, is diverted into an SBS phase conjugator and proceeds out of the SBS phase conjugator back through the ring in an equal but opposite direction for two passes, further reducing phase perturbations. A master oscillator inputs the beam through an isolation cell (Faraday or Pockels) which transmits the beam into the ring without polarization rotation. The isolation cell rotates polarization only in beams proceeding out of the ring to direct the beams out of the amplifier. The diffraction limited quality of the input beam is preserved in the amplifier so that a high power output beam having nearly the same diffraction limited quality is produced."

U.S. Pat. No. 5,285,310 for a high power regenerative laser amplifier by John L. Miller, Lloyd A. Hackel, Clifford B. Dane, and Luis E. Zapata provides the following description, A regenerative amplifier design capable of operating at high energy per pulse, for instance, from 20–100 Joules, at moderate repetition rates, for instance from 5–20 Hertz is provided. The laser amplifier comprises a gain medium and source of pump energy coupled with the gain medium; a Pockels cell, which rotates an incident beam in response to application of a control signal; an optical relay system defining a first relay plane near the gain medium and a second relay plane near the rotator; and a plurality of reflectors configured to define an optical path through the gain medium, optical relay and Pockels cell, such that each transit of the optical path includes at least one pass through the gain medium and only one pass through the Pockels cell. An input coupler, and an output coupler are provided, implemented by a single polarizer. A control circuit coupled to the Pockels cell generates the control signal in timed relationship with the input pulse so that the input pulse is captured by the input coupler and proceeds through at least one transit of the optical path, and then the control signal is applied to cause rotation of the pulse to a polarization reflected by the polarizer, after which the captured pulse passes through the gain medium at least once more and is reflected out of the optical path by the polarizer before passing through the rotator again to provide an amplified pulse."

U.S. Pat. No. 5,689,363 for a long-pulse-width narrow-bandwidth solid state laser by Clifford B. Dane and Lloyd A. Hackel, patented Nov. 18, 1997 provides the following description, "A long pulse laser system emits 500–1000 ns quasi-rectangular pulses at 527 nm with near diffraction-limited divergence and near transform-limited bandwidth. The system consists of one or more flashlamp-pumped Nd:glass zig-zag amplifiers, a very low threshold stimulated-Brillouin-scattering (SBS) phase conjugator system, and a free-running single frequency Nd:YLF master oscillator. Completely passive polarization switching provides eight amplifier gain passes. Multiple frequency output can be generated by using SBS cells having different pressures of a gaseous SBS medium or different SBS materials. This long pulse, low divergence, narrow-bandwidth, multi-frequency output laser system is ideally suited for use as an illuminator for long range speckle imaging applications. Because of its high average power and high beam quality, this system has application in any process that would benefit from a long pulse format, including material processing and medical applications.

SUMMARY

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

One embodiment of the present invention provides a laser system for producing a green (green=527 nm) or UV output beam for illuminating a large area with relatively high beam fluence. In this embodiment a Nd:glass laser produces a near-infrared output by means of an oscillator that generates a high quality but low power output and then multi-pass through and amplification in a zig-zag slab amplifier and wavefront correction in a phase conjugator at the midway point of the multi-pass amplification. The green or UV output is generated by means of conversion crystals that follow final propagation through the zig-zag slab amplifier.

In another embodiment the conversion crystals are configured in aspect ratio to match the zig-zag slab amplifier for producing a green or UV output beam for illuminating a large area with relatively high beam fluence. They can also be configured in a different aspect ratio than the slab with an optical element configured to change the beam shape between the amplifier and the conversion crystals.

Another embodiment provides a laser method for producing a green or UV output beam for illuminating a large area with relatively high beam fluence. It includes the steps of providing a near-infrared output, amplifying the near-infrared output, and using conversion crystals configured in an alternating z arrangement for producing a green or UV output beam for illuminating a large area with relatively high beam fluence.

An embodiment of the present invention provides a green or UV, high single pulse energy, high average power solid-state laser system. Another embodiment of the present invention provides a green or UV output by incorporating nonlinear crystals internally within the phase conjugated regenerative laser amplifier to produce the green or UV output with good near field uniformity and near diffraction limited far field beam quality.

Another embodiment of the present invention provides high conversion efficiency into the green or Uv by incorporating both control of polarization and color separation. Another embodiment of the present invention provides a green or UV output with pulse length selected from 5 nsec to as long as 1 microsecond.

Another embodiment of the present invention provides a green (green=527 nm) or UV output at either 351 nm or 263 nm or a visible output at 527 nm.

Another embodiment of the present invention provides high conversion efficiency into the green or UV by controlling the shape of the frequency converter crystals.

Another embodiment of the present invention provides high conversion efficiency into the green or UV by incorporating two crystals in an alternating arrangement of the z-axis of the frequency converter crystals to reduce the angular sensitivity by a factor of two. Another embodiment of the present invention provides high conversion efficiency into the green or UV by controlling the removal of heat deposited in the frequency converter crystals from absorbed converted or unconverted light.

Another embodiment of the present invention provides an all solid state green or UV laser system that delivers both high energy pulses and high rep rate pulses with a pulse width in the 5 nsec to 1 $\mu$ sec range, green or UV energy in the range of 10 to 100 J and the pulse repetition rate in the range of 5 to 10 Hz. The green or UV laser is comprised of one or more flashlamp-pumped zig-zag slab Nd:glass amplifiers, an SBS phase conjugator, a free running single frequency oscillator, and a frequency doubler or tripler or quadrupler. This green or UV laser system has the ability to illuminate a large area with high beam fluence. It is important in applications including the thermal treatment of semiconductors, thermal annealing of flat panel displays, and green or UV conditioning of optics.

In another embodiment, the flashlamp pumping of the laser is replaced with diode pumping for more efficiency and less thermal loading.

Other features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description and by practice of the invention.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

DETAILED DESCRIPTION OF THE INVENTION

Figure 1:
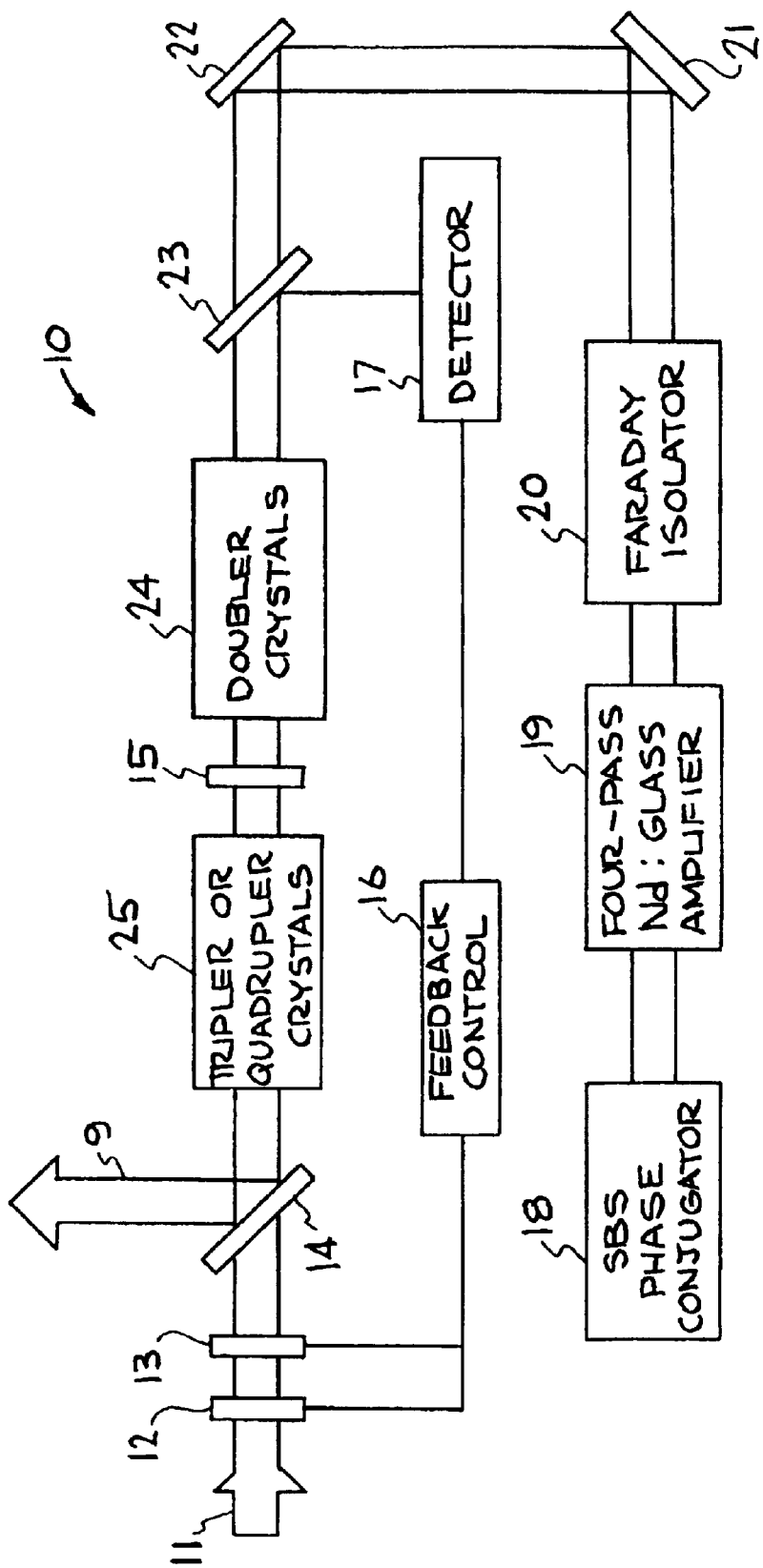
FIG. 1 illustrates an embodiment of the present invention wherein a green or UV laser system incorporates a frequency conversion system within the phase conjugation loop of the power amplifier with the frequency converter configured to match the aspect ratio of the power amplifier.

Referring now to the drawings, to the following detailed information, and to incorporated materials; a detailed description of the invention, including specific embodiments, is presented. The detailed description serves to explain the principles of the invention. The invention is susceptible modifications and alternative forms. The invention is not limited to the particular forms disclosed. The invention covers all modifications, equivalents, and alternatives falling within the spirit and scope of the invention as defined by the claims.

Referring Now to FIG. 1, an embodiment of a system constructed in accordance with the present invention is illustrated. This system is designated generally by the reference numeral 10. The embodiment provides a system 10 that has the capability of illuminating a large area with relatively high beam fluence. This is useful for many applications. For example, illuminating a large area with relatively high beam fluence is needed for the thermal treatment of semiconductors, the annealing of flat panel liquid crystal displays, and the treatment of optics to condition them for high power laser operation. Rapid thermal annealing is disclosed in U.S. Pat. No. 5,523,262 to Jim Fair and John Mehlhaff, assigned to Intevac, Inc., patented Jun. 4, 1996. The disclosure of U.S. Pat. No. 5,523,262 is incorporated herein by this reference.

The system 10 includes the following structural elements and components: detector 17, green (green=527 nm) or UV output beam 9, oscillator input beam shaped for amplification 11, ½ wave retarder 12, ¼ wave retarder 13, dichroic beam splitter 14, specialized quartz waveplate 15, feedback control 16, SBS phase conjugator 18, four-pass Nd:glass amplifier 19, faraday isolator 20, HR 21, HR 22, polarizer 23, doubler crystals 24, and tripler or quadrupler crystals 25.

The system 10 is based on frequency converting the near-infrared output of a Nd:glass laser. The Nd: glass laser is comprised of a master oscillator whose near-infrared output is amplified in a power amplifier. The output of the amplifier is then frequency tripled to green (green=527 nm) or UV at 351 nm or quadrupled to the green (green=527 nm) or UV at 263 nm. High beam quality is achieved in the power amplifier by highly uniform pumping of the zig-zag slab and by the use of SBS phase conjugation. High conversion efficiency is achieved in the frequency converter by use of the alternating-Z configuration for each stage of frequency conversion.

In order to achieve the high near field and far field beam quality necessary for reliable application, the output of the master oscillator is injected through the frequency conversion crystals coated with AR coatings selected to optimize UV output (See FIG. 2) as the path into the power amplifier and to the phase conjugator. To achieve this injection, output of the laser oscillator is configured in size to match the crystal apertures and is injected with a dichrochic mirror 14 that reflects infrared light and transmits the green or UV output. In this way the beam going to the phase conjugator samples the wavefront of the conversion crystals and gets a near exact phase correction when reflected back out, amplified and frequency converted.

Figure 2:
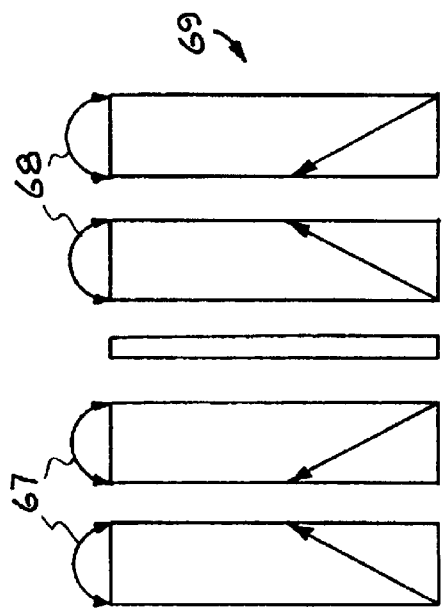
FIG. 2 is a side view of the frequency convertor assembly of FIG. 1.

Referring now to FIG. 2, the frequency convertor assembly of FIG. 1 is described in greater detail. A side view of the frequency convertor assembly, generally designated by the reference numeral 27, is shown in FIG. 2. The frequency convertor assembly 27 includes the following elements and components: doubler crystals 24, tripler or quadrupler crystals 25, optical axis of nonlinear crystals 26, angular tuning 28, and angular tuning 29.

The excess heat deposited in the crystals 24 and 26 during the conversion process is carried off by means of a cooling system integral to the assembly holding the crystals. The thin dimension of each crystal is heat sunk to the cooling block by means of high thermal conductivity metal impregnated elastomer gaskets. The shape of these gaskets can be used to tailor the thermally conductive footprint on the crystals in order to compensate for specific beam dimensions relative to the crystal size or for specific spatial structure in the beam to be converted. Heat rejection and temperature regulation can be accomplished by flowing water through the cooling blocks or by the use of thermo-electric coolers placed between the blocks and air-cooled finned heat sinks.

Each stage of the frequency conversion is accomplished with a pair of crystals 24 and 25 arranged in an alternating z configuration. This refers to the optical tuning axis 26 of the two crystals so that they are rotated by 180° about the beam direction. This configuration results in an increase in insensitivity to crystal alignment tolerances. The pair consists of two crystals arranged so that their tuning axes are at approximately +45° from the propagation direction and −45°. In arranging the pair of crystals in this non-parallel fashion the phase mismatch developed in the first crystal of the pair is undone after propagation through the second crystal. This results in reduced sensitivity of both angular and thermal offsets from perfect phase matching. Since angular offsets form perfect phase matching can come from either imperfect orientation of the crystal's optical axis or from laser beam departures from flat wavefront the scheme provides for higher conversion efficiencies than a single crystal scheme.

This alternating-z configuration achieves a factor of 2 reduction in the angular sensitivity of the crystal in the sensitive tuning direction allowing high conversion efficiency for peak powers in the tens to hundreds of megawatts per square centimeter range.

Frequency conversion into the green or UV is accomplished in 2 steps; there are 2 pairs of crystals. The first pair of crystals is the second harmonic generator (or doubler). Out of the pair of crystals comes both the fundamental and second harmonic wavelengths. The polarization of each is then controlled as needed to enter the second pair of crystals. A special quartz waveplate is constructed to rotate the linear polarization state of both wavelengths as needed. The second pair is either a mixer pair in the case of the tripler or another doubler in the case of the quadrupler.

The frequency conversion crystals coated with AR coatings selected to optimize UV output can be configured in a number of possible ways. In another embodiment, the crystals are configured as a tall thin set with aperture to match the aperture of the zig-zag amplifier slab. In that configuration with one narrow dimension, the heat transfer for heat deposited in the crystals from absorption of the fundamental or converted wavelengths is maximized. In another embodiment, the crystals are placed in a portion of the beam in which the beam is close to square in profile and the crystals thus can be square, making for better polarization and crystal axis matching.

The combination of a quarter-wave and a half-wave polarization retarding plates placed into the injection beam, before the dichroic, allow the input beam to be configured to an arbitrary pure polarization state. This is important to compensate for polarization rotation in the doubler crystals in order to maximize the oscillator energy that is injected into the multi-pass laser amplifier.

A feedback system on the rotational angle of these waveplates can automatically maintain optimal injected pulse energy by monitoring and minimizing the energy reflected from the input polarizer by feedback controlled rotation of the oscillator polarization. Optimization of the tripler may include the use of a special waveplate to rotate both the fundamental and second harmonic polarization by 90 degrees to allow maintaining the heat flow out of both crystals in the insensitive tuning axes of both the doubler and the tripler.

Figure 3:
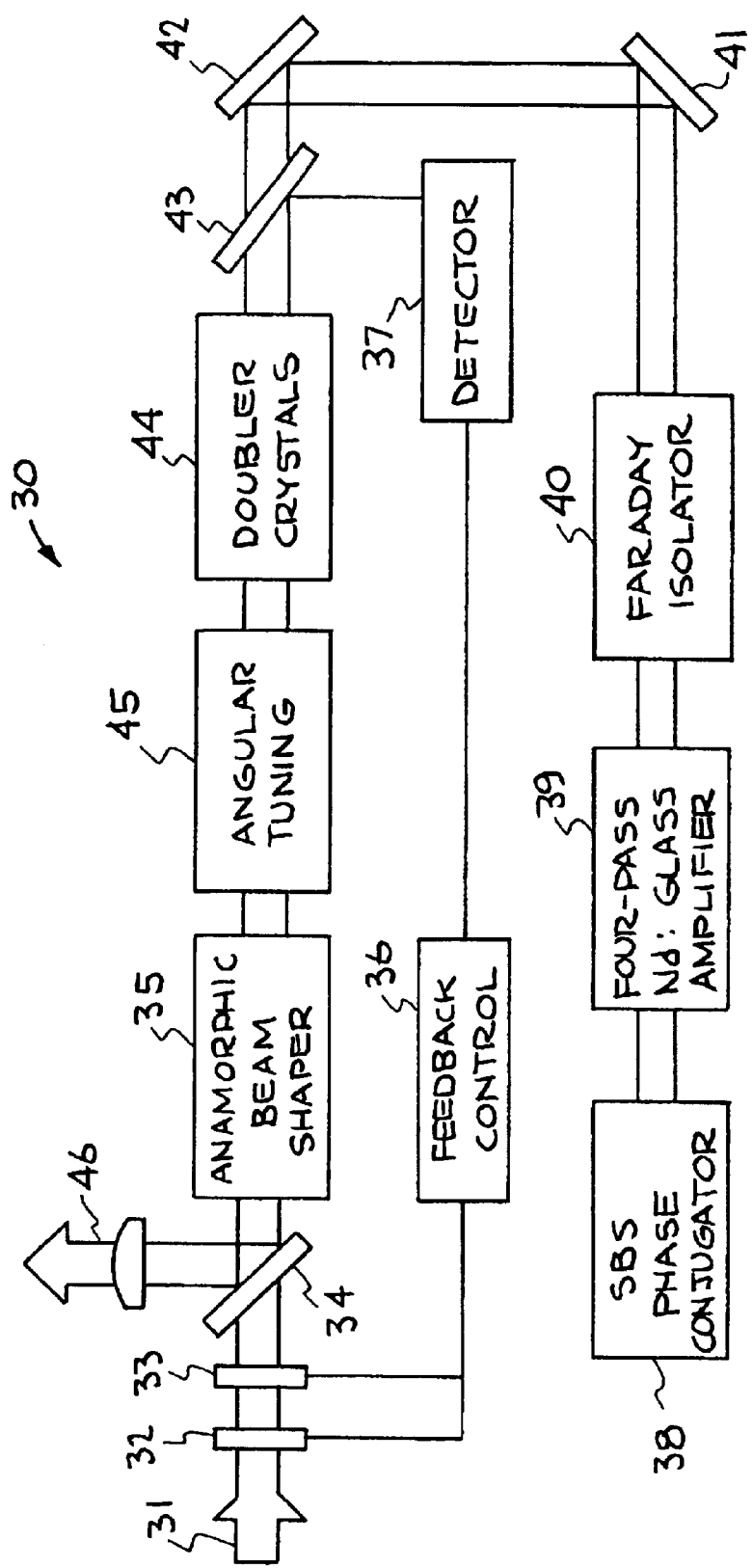
FIG. 3 illustrates an embodiment of the present invention wherein a green or UV laser system incorporates a frequency conversion system within the phase conjugation loop of the power amplifier with the frequency converter configured to match the aspect ratio of the input oscillator pulse.

Referring now to FIG. 3, another embodiment of a system constructed in accordance with the present invention is shown. This system is designated generally by the reference numeral 30. The system 30 that has the capability of illuminating a large area with relatively high beam fluence. This is useful for many applications. For example, illuminating a large area with relatively high beam fluence is needed for the thermal treatment of semiconductors, the annealing of flat panel liquid crystal displays, and the treatment of optics to condition them for high power laser operation.

The system 30 includes the following structural elements and components: detector 37, green (green=527 nm) or UV output beam 46, oscillator input beam shaped for amplification 31, ½ wave retarder 32, ¼ wave retarder 33, dichroic beam splitter 34, feedback control 36, SBS phase conjugator 38, four-pass Nd:glass amplifier 39, faraday isolator 40, HR 41, HR 42, polarizer 43, doubler crystals 44, angular tuning 45,and anamorphic beam shaper 35.

Figure 4:
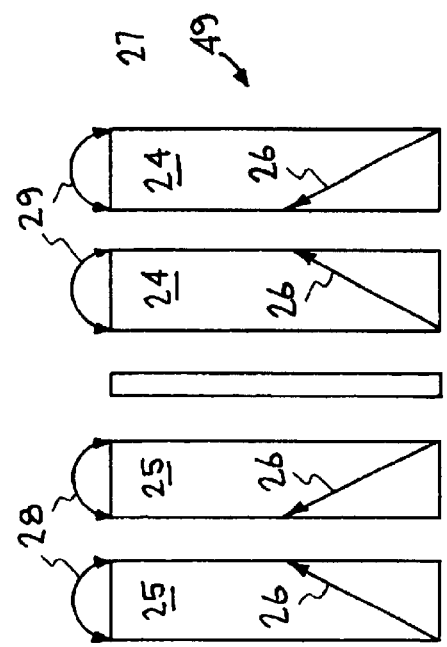
FIG. 4 is a side view of the frequency convertor assembly of FIG. 3.

The operation of the system 30 is analogous to the operation of the system shown in FIG. 1. In the system 30, a square input is used for injection into the amplifier and the conversion crystals are within the phase conjugation loop of the amplifier. In the system 30, the aperture of the crystals nearly matches that of the slab amplifier. Referring now to FIG. 4, the frequency convertor assembly of FIG. 3 is described in greater detail. A side view of the frequency convertor assembly, generally designated by the reference numeral 49, is shown in FIG. 4. The frequency convertor assembly 49 includes the following elements and components: tripler or quadrupler crystals 47 and angular tuning 48. The configuration of the optical axes illustrated in FIG. 4 shows where the tripler crystals are oriented parallel to the polarization and the doubler crystals at ±45°.

Figure 6:
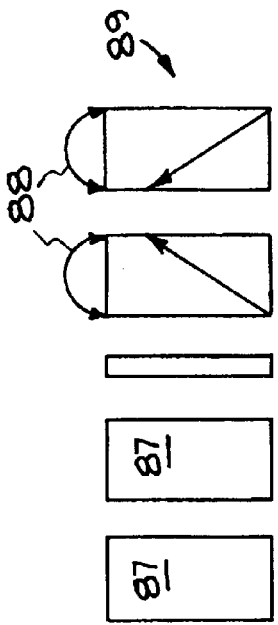
FIG. 6 is a side view of the frequency convertor assembly of FIG. 5.
Figure 5:
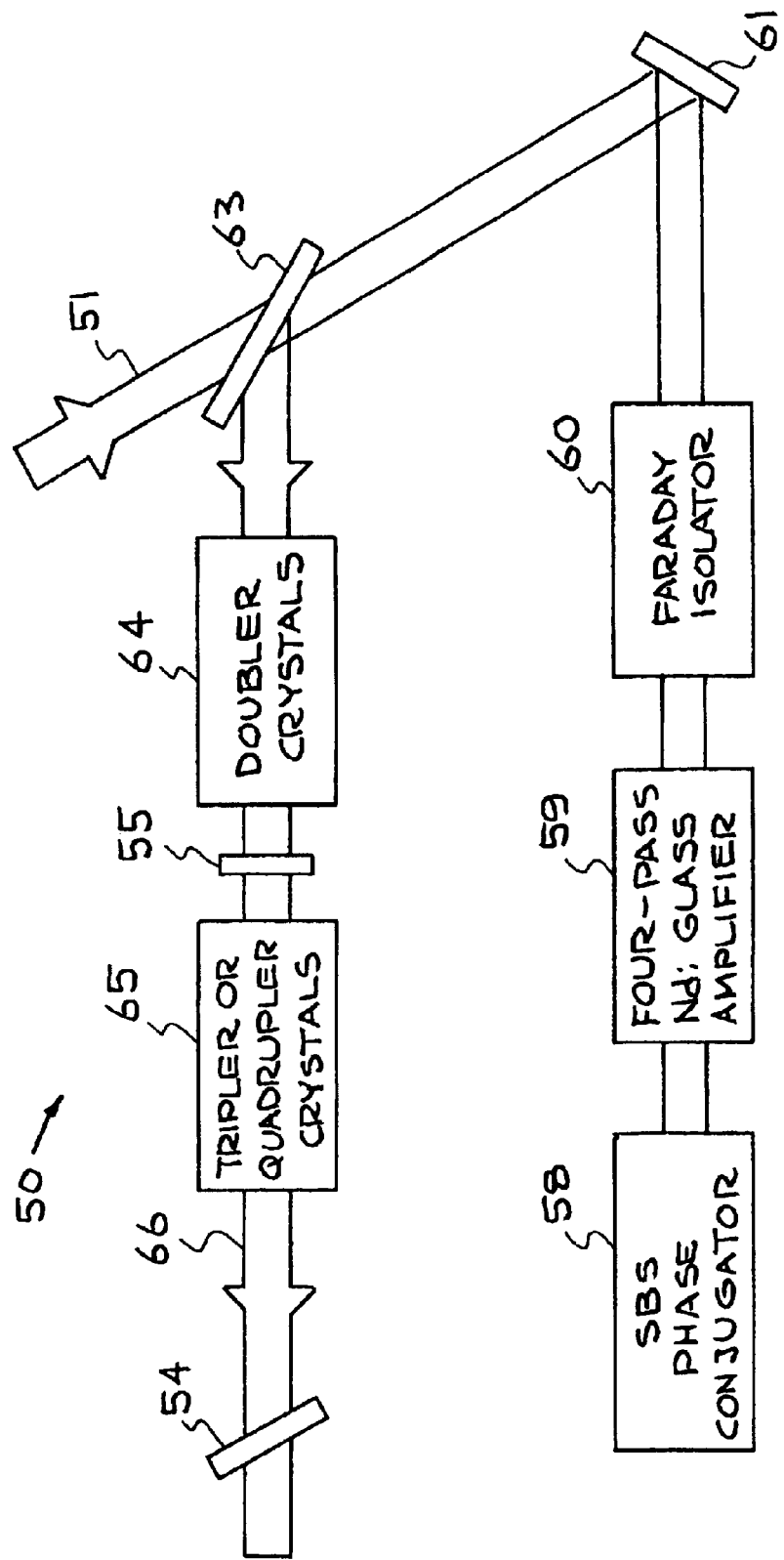
FIG. 5 illustrates an embodiment of the present invention wherein a green or UV laser system incorporates the frequency conversion system external to the phase conjugation loop of the power amplifier with the frequency converter configured to match the aspect ratio of the power amplifier.

Referring Now to FIG. 5, another embodiment of a system constructed in accordance with the present invention is shown. This system is designated generally by the reference numeral 50. The system 50 includes the following structural elements and components: green (green=527 nm) or UV output beam 66, dichronic beam splitter 54, oscillator input beam shaped for amplification 51, SBS phase conjugator 58, four-pass Nd:glass amplifier 59, faraday isolator 60, HR 61, polarizer 63, doubler crystals 64, and tripler or quadrupler crystals 65. The operation of the system 50 is analogous to the operation of the system 10 shown in FIG. 1. FIG. 5 shows an alternate to the systems shown in FIGS. 1 and 3 in which the conversion crystals are not included within the phase conjugation loop. The frequency convertor assembly of FIG. 5 is described in greater detail in FIG. 6. A side view of the frequency convertor assembly, generally designated by the reference numeral 69, is shown in FIG. 6. The frequency convertor assembly 69 includes the following elements and components: angular tuning 67 and angular tuning 68. Polarization orientation of the doubler crystals 64 and tripler cyrstals 65 is shown in FIG. 6.

Figure 8:
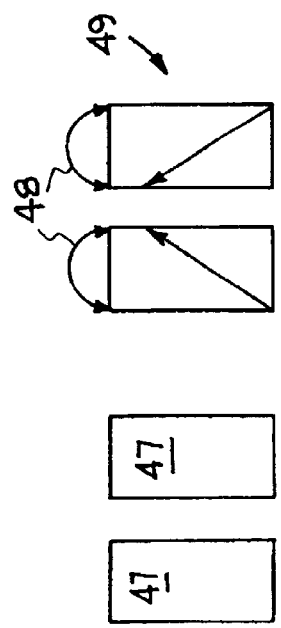
FIG. 8 is a side view of the frequency convertor assembly of FIG. 7.
Figure 7:
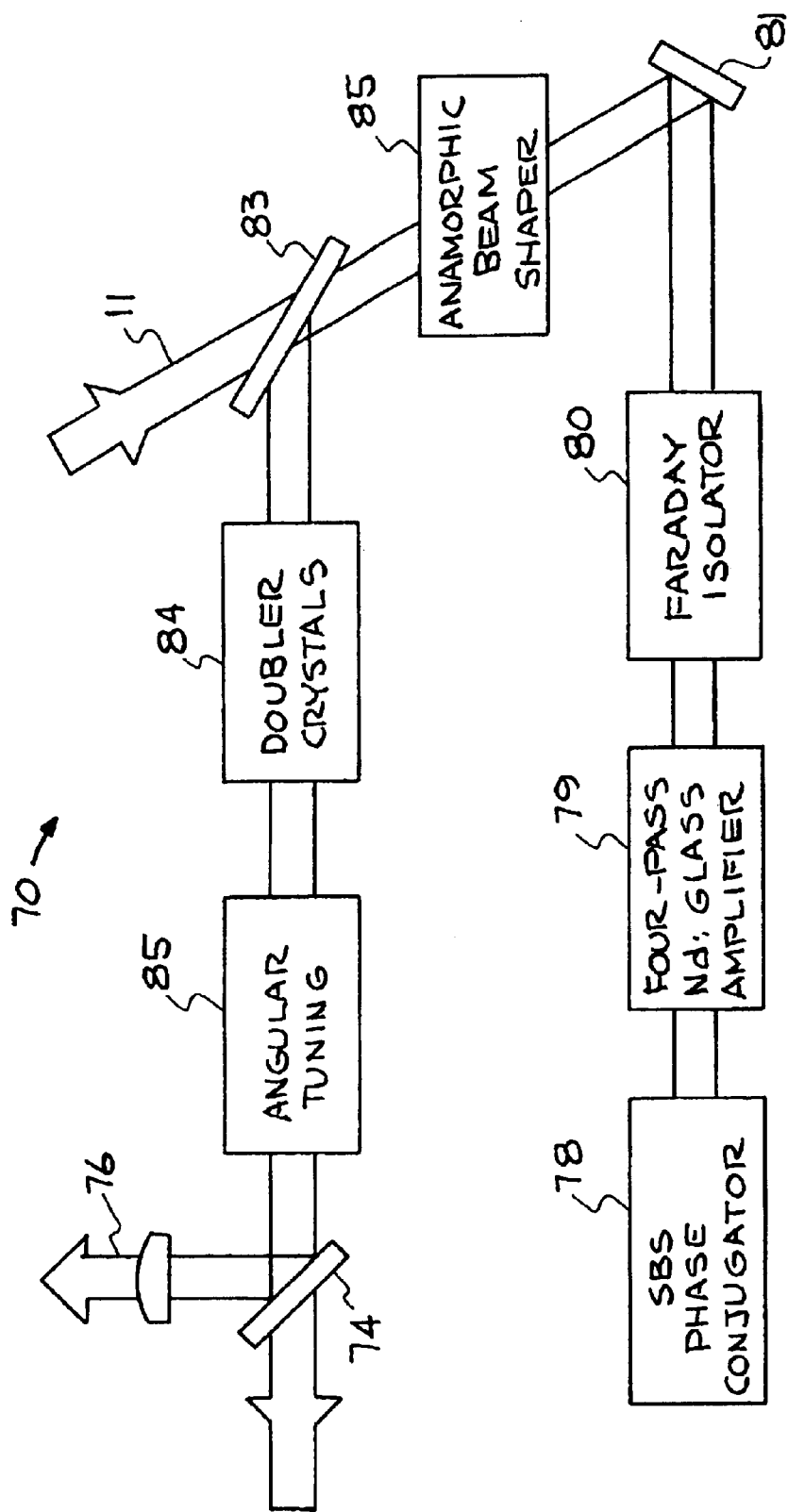
FIG. 7 illustrates an embodiment of the present invention wherein a green or UV laser system incorporates the frequency conversion system external to the phase conjugation loop of the power amplifier with the frequency converter configured to match the aspect ratio of the input oscillator.

Referring Now to FIG. 7, another embodiment of a system constructed in accordance with the present invention is shown. This system is designated generally by the reference numeral 70. The system 70 includes the following structural elements and components: green (green=527 nm) or UV output beam 76, oscillator input beam shaped for amplification 71, SBS phase conjugator 78, four-pass Nd:glass amplifier 79, faraday isolator 80, HR 81, polarizer 83, doubler crystals 84, and angular tuning 85. FIG. 7 shows an alternate to the systems shown in FIGS. 1 and 3 in which the conversion crystals are not included within the phase conjugation loop. The operation of the system 70 is analogous to the operation of the systems shown in FIGS. 1 and 2. The frequency convertor assembly of FIG. 7 is described in greater detail in FIG. 8. A side view of the frequency convertor assembly, generally designated by the reference numeral 89, is shown in FIG. 8. The frequency convertor assembly 89 includes the following elements and components: tripler or quadrupler crystals 87 and angular tuning 88. Polarization orientation of the doubler crystals 84 and tripler cyrstals 87 is shown in FIG. 8.

Figure 9:
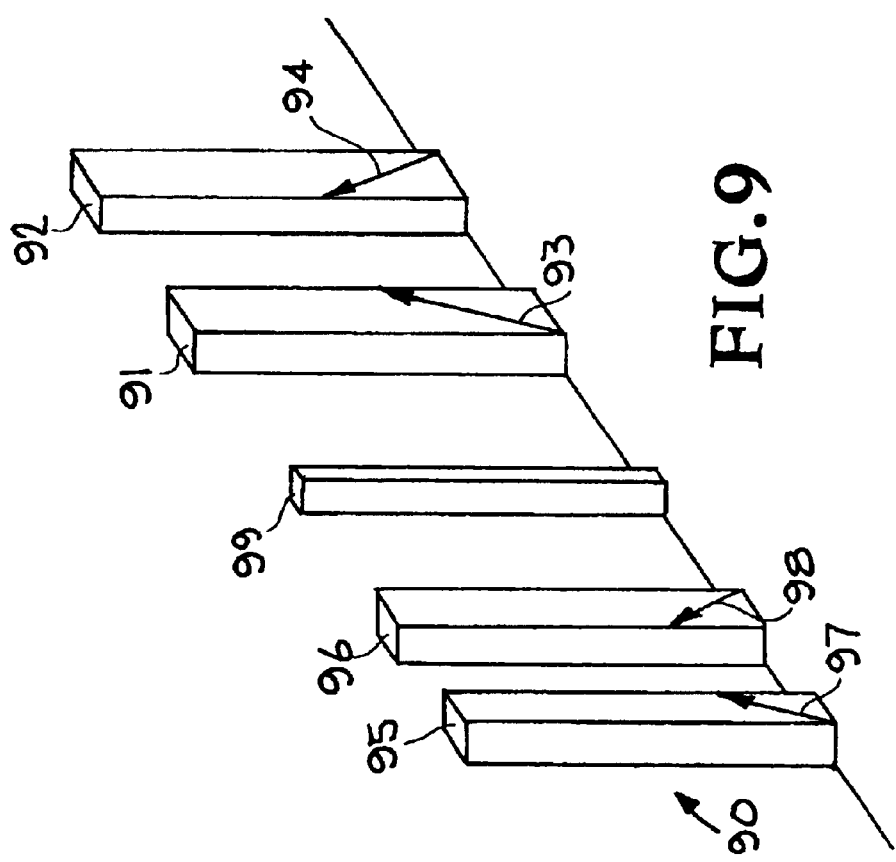
FIG. 9 is a perspective view of the frequency converter crystals.

Referring now to FIG. 9, a perspective view of the frequency converter crystals 91, 92, 95, and 96 is shown. The frequency converter crystals are designated generally by the reference numeral 90. Both pair of crystals are a tall thin sets of rectangular crystals with apertures to match the aperture of said zig-zag slab amplifier. The conversion crystals have angular sensitivity in the sensitive tuning direction and are employed to achieve a factor of "two" reduction in the angular sensitivity of the crystal in the sensitive tuning direction allowing high conversion efficiency for peak powers as low as in the tens to hundreds of megawatts per square centimeter range. In one embodiment the conversion crystals have the sensitive tuning direction aligned parallel to the tallest crystal dimension to reduce sensitivity of the nonlinear conversion to 1 $\mu$m wavefront aberrations.

In another embodiment the conversion crystal are arranged in pairs in an alternating Z configuration wherein the second crystal of each pair is rotated 180° about the extraordinary axis of the crystal. Each pair performs as one long crystal with the angular sensitivity in the sensitive tuning direction of a crystal of one half the total length of the pair. This arrangement allows high conversion efficiency of peak power as low as the tens to hundreds of megawatts per square centimeter range.

In another embodiment the conversion crystals are configured to control thermal gradients by removing heat from the sides of the crystal and establishing thermal gradients along the insensitive tuning axis of each crystal. Thermal sensitivity to induced thermal gradients induced in average power operation is minimized.

Frequency conversion into the green or UV is accomplished in 2 steps; there are 2 pairs of crystals. The first pair of crystals is the second harmonic generator (or doubler). Out of the pair of crystals comes both the fundamental and second harmonic wavelengths. The polarization of each is then controlled as needed to enter the second pair of crystals. The advantage of the high aspect ratio of height to width in the conversion crystals is to attain a large aperture while maintaining a short dimension for heat removal. The crystals 91 and 92 are the UV conversion pair. The crystals 95 and 96 are the doubler pair. Element 99 is a polarization control plate (rotator and/or waveplate).

Figure 10:
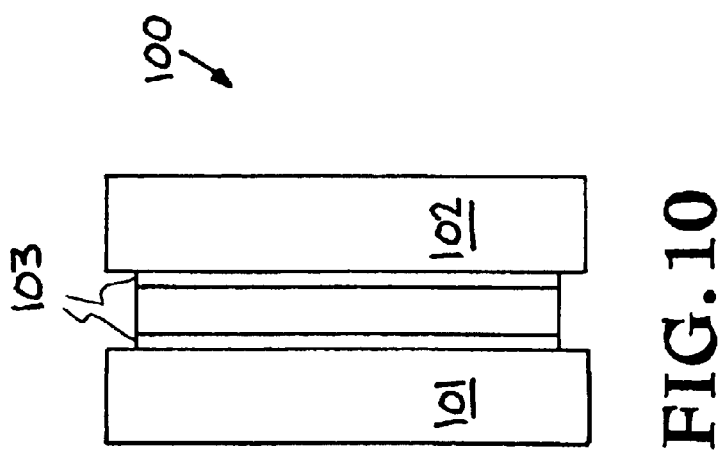
FIG. 10 illustrates heat removal from a crystal.

Referring now to FIG. 10, an embodiment of a system for removing heat from a crystal is illustrated. The system is generally designated by the reference numeral 100. Heat removal from crystal 101 through a thin elastomer 103. The heat is transferred into a heat sink consisting of a water cooling manifold 102 or a otherwise controlled temperature sink.

The embodiments of the invention illustrated in FIGS. 1 through 10 provide various systems for producing a green or UV output beams for illuminating a large area with relatively high beam fluence. As shown by the various embodiments described, the systems include an oscillator that generates a high quality but low power output, a zig-zag slab amplifier operatively connected to the oscillator, a phase conjugator operatively connected to the zig-zag slab amplifier, and non-linear conversion crystals operatively connected to the zig-zag slab amplifier for producing a green or UV output beam for illuminating a large area with relatively high beam fluence.

In one embodiment the conversion crystals are configured in aspect ratio to match the zig-zag slab amplifier. In another embodiment the conversion crystals are within a phase conjugation loop including the phase conjugator. In another embodiment the oscillator generates a near infrared beam having a near infrared input polarization state and the near infrared input polarization state is controlled by monitoring the conversion process to optimize the green or UV output beam. In another embodiment the non-linear conversion crystals have an angular orientation and the angular orientation of the conversion crystals is controlled by monitoring the conversion process to optimize the green or UV output beam. In another embodiment the temperature of the conversion crystals is controlled by monitoring the conversion process to optimize the green or UV output beam.

Another embodiment includes a feedback control system to optimize the conversion through the conversion crystals. In another embodiment the conversion crystals are coated with AR coatings selected to optimize UV output. In another embodiment the conversion crystals are configured in an alternating z arrangement to convert the near-infrared output to green or UV with relatively high beam fluence. In another embodiment the conversion crystals are one pair of crystals configured in an alternating z arrangements for converting the near-infrared output to green or UV with relatively high beam fluence.

In another embodiment the conversion crystals are two pair of crystals configured in an alternating z arrangements for converting the near-infrared output to green or UV with relatively high beam fluence. In another embodiment one pair of the crystals are for doubling the near-infrared output and the other pair of the crystals are for tripling the near-infrared output. In another embodiment one pair of the crystals are for doubling the near-infrared output and the other pair of the crystals are for quadrupling the near-infrared output. In another embodiment the one pair of crystals and the other pair of crystals are rectangular with apertures to match the apertures of the zig-zag slab amplifier. In another embodiment the one pair of crystals and the other pair of crystals are rectangular with apertures to achieve a desirable output irradiance distribution of the zig-zag slab amplifier. In another embodiment the one pair of crystals and the other pair of crystals are a tall thin set of rectangular crystals with apertures to match the aperture of the zig-zag slab amplifier. In another embodiment the conversion crystals are arranged in pairs in an alternating z configuration to achieve a factor of "two" reduction in the angular sensitivity of the crystal in the sensitive tuning direction allowing high conversion efficiency for peak powers as low as in the tens to hundreds of megawatts per square centimeter range. In another embodiment the conversion crystals have the sensitive tuning direction aligned parallel to the tallest crystal dimension to reduce sensitivity of the nonlinear conversion to 1 $\mu$m wavefront aberrations. In another embodiment the conversion crystal are arranged in pairs in an alternating Z configuration wherein the second crystal of each pair is rotated 180° about the extraordinary axis of the crystal. In another embodiment the conversion crystals are configured to control thermal gradients by removing heat from the sides of the crystal and establishing thermal gradients along the insensitive tuning axis of each crystal.

The embodiments described provide laser methods for producing green or UV output beams for illuminating a large area with relatively high beam fluence. The methods include the steps of providing a near-infrared output, amplifying the near-infrared output, multi-passing the near-infrared output through and amplification in a zig-zag slab amplifier and wavefront correction in a phase conjugator, and using conversion crystals configured in an alternating z arrangement for producing a green or UV output beam for illuminating a large area with relatively high beam fluence. In one embodiment two pair of crystals configured in an alternating z arrangements are used for producing a green or UV output with relatively high beam fluence. In another embodiment one pair of the crystals are used for doubling the near-infrared output and the other pair of the crystals are used for tripling the near-infrared output for producing a green or UV output with relatively high beam fluence.

Another embodiment includes using one pair of the crystals for doubling the near-infrared output and using the other pair of the crystals for quadrupling the near-infrared output for producing a green or UV output with relatively high beam fluence. In another embodiment the conversion crystal means are used to achieve a factor of "two" reduction in the angular sensitivity of the crystal in the sensitive tuning direction allowing high conversion efficiency for peak powers in the tens to hundreds of megawatts per square centimeter range. In another embodiment the green or UV output beam is optimized by control of the near infrared input polarization state. In another embodiment the green or UV output beam is optimized by control of the angular orientation of the conversion crystal in the sensitive tuning direction. In another embodiment the green or UV output beam is optimized by control of the temperature of the conversion crystals.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A system for producing a green or UV output beam for illuminating a large area with relatively high beam fluence, comprising:

an oscillator that generates a high quality but low power output, a zig-zag slab amplifier operatively connected to said oscillator for amplifying said low power output, a phase conjugator operatively connected to said zig-zag slab amplifier for multi-passing said low power output through said zig-zag slab amplifier, and non-linear conversion crystals operatively connected to said zig-zag slab amplifier for wavefront correction of said low power output for producing said green or UV output beam for illuminating a large area with relatively high beam fluence.

2. The system for producing a green or UV output beam for illuminating a large area with relatively high beam fluence of claim 1, wherein said conversion crystals are configured in aspect ratio to match said zig-zag slab amplifier.

3. The system for producing a green or UV output beam for illuminating a large area with relatively high beam fluence of claim 1, wherein said conversion crystals are within a phase conjugation loop including said phase conjugator.

4. The system for producing a green or UV output beam for illuminating a large area with relatively high beam fluence of claim 1, wherein said oscillator generates a near infrared beam having a near infrared input polarization state and said near infrared input polarization state is controlled by monitoring the conversion process to optimize the green or UV output beam.

5. The system for producing a green or UV output beam for illuminating a large area with relatively high beam fluence of claim 4, wherein said non-linear conversion crystals have an angular orientation and the angular orientation of said conversion crystals is controlled by monitoring the conversion process to optimize the green or UV output beam.

6. The system for producing a green or UV output beam for illuminating a large area with relatively high beam fluence of claim 4, wherein the temperature of the conversion crystals is controlled by monitoring the conversion process to optimize the green or UV output beam.

7. The system for producing a green or UV output beam for illuminating a large area with relatively high beam fluence of claim 1, including a feedback control system to optimize the conversion through said conversion crystals.

8. The system for producing a green or UV output beam for illuminating a large area with relatively high beam fluence of claim 1, wherein said conversion crystals are coated with AR coatings selected to optimize UV output.

9. The system for producing a green or UV output beam for illuminating a large area with relatively high beam fluence of claim 1, wherein said conversion crystals are configured in an alternating z arrangement to convert said near-infrared output to green or UV with relatively high beam fluence.

10. The system for producing a green or UV output beam for illuminating a large area with relatively high beam fluence of claim 1, wherein said conversion crystals are one pair of crystals configured in an alternating z arrangements for converting said near-infrared output to green or UV with relatively high beam fluence.

11. The system for producing a green or UV output beam for illuminating a large area with relatively high beam fluence of claim 1, wherein said conversion crystals are two pair of crystals configured in an alternating z arrangements for converting said near-infrared output to green or UV with relatively high beam fluence.

12. The system for producing a green or UV output beam for illuminating a large area with relatively high beam fluence of claim 11, wherein one pair of said crystals are for doubling said near-infrared output and the other pair of said crystals are for tripling said near-infrared output.

13. The system for producing a green or UV output beam for illuminating a large area with relatively high beam fluence of claim 11, wherein one pair of said crystals are for doubling said near-infrared output and the other pair of said crystals are for quadrupling said near-infrared output.

14. The system for producing a green or UV output beam for illuminating a large area with relatively high beam fluence of claim 11, wherein said one pair of crystals and said other pair of crystals are rectangular with apertures to match the apertures of said zig-zag slab amplifier.

15. The system for producing a green or UV output beam for illuminating a large area with relatively high beam fluence of claim 11, wherein said one pair of crystals and said other pair of crystals are rectangular with apertures to achieve a desirable output irradiance distribution of said zig-zag slab amplifier.

16. The system for producing a green or UV output beam for illuminating a large area with relatively high beam fluence of claim 11, wherein said one pair of crystals and said other pair of crystals are a tall thin set of rectangular crystals with apertures to match the aperture of said zig-zag slab amplifier.

17. The system for producing a green or UV output beam for illuminating a large area with relatively high beam fluence of claim 1, wherein said conversion crystals are arranged in pairs in an alternating z configuration to achieve a factor of "two" reduction in the angular sensitivity of the crystal in the sensitive tuning direction allowing high conversion efficiency for peak powers as low as in the tens to hundreds of megawatts per square centimeter range.

18. The system for producing a green or UV output beam for illuminating a large area with relatively high beam fluence of claim 1, wherein said conversion crystals have the sensitive tuning direction aligned parallel to the tallest crystal dimension to reduce sensitivity of the nonlinear conversion to 1 $\mu$m wavefront aberrations.

19. The system for producing a green or UV output beam for illuminating a large area with relatively high beam fluence of claim 1, wherein said conversion crystal are arranged in pairs in an alternating Z configuration wherein the second crystal of each pair is rotated 180° about the extraordinary axis of the crystal.

20. The system for producing a green or UV output beam for illuminating a large area with relatively high beam fluence of claim 1, wherein said conversion crystals are configured to control thermal gradients by removing heat from the sides of the crystal and establishing thermal gradients along the insensitive tuning axis of each crystal.

21. A system for producing a green or UV output beam for illuminating a large area with relatively high beam fluence, comprising:

near-infrared means for producing a near-infrared output, zig-zag slab amplifier means operatively connected to said near-infrared means for amplifying said near-infrared output, phase conjugator means operatively connected to said amplifier means amplifier for multi-passing said near-infrared output through said zig-zag slab amplifier, and conversion means including non-linear conversion crystals operatively to said zig-zag slab amplifier means and said phase conjugator means for converting said near-infrared output to green or UV with relatively high beam fluence.

22. The system for producing a green or UV output beam for illuminating a large area with relatively high beam fluence of claim 21, wherein said conversion means are within a phase conjugation loop including said phase conjugator means.

23. The system for producing a green or UV output beam for illuminating a large area with relatively high beam fluence of claim 21, including a feedback control system to optimize the conversion through said conversion means.

24. The system for producing a green or UV output beam for illuminating a large area with relatively high beam fluence of claim 21, wherein said conversion means is a non-linear crystal means.

25. The system for producing a green or UV output beam for illuminating a large area with relatively high beam fluence of claim 21, wherein said conversion means is configured in an alternating z arrangement to convert said near-infrared output to green or UV with relatively high beam fluence.

26. The system for producing a green or UV output beam for illuminating a large area with relatively high beam fluence of claim 21, wherein said conversion crystal means have angular sensitivity reduced by a factor of two in the sensitive tuning direction by configuring the crystal in the alternating z geometry to allow high conversion efficiency for peak powers in the tens to hundreds of megawatts per square centimeter range.

27. A laser method for producing a green or UV output beam for illuminating a large area with relatively high beam fluence, comprising the steps of:

provinding a near-infrared output using a near-infrared means, amplifying said near-infrared output using a zig-zag slab amplifier, multi-passing said near-infrared output through and providing amplification in said zig-zag slab amplifier and providing wavefront correction of said near-infrared output in a phase conjugator, and using non-linear conversion crystals configured in an alternating z arrangement for producing said green or UV output beam for illuminating a large area with relatively high beam fluence.

28. The laser method of claim 27, including using two pair of crystals configured in an alternating z arrangements for producing a green or UV output with relatively high beam fluence.

29. The laser method of claim 28, including using one pair of said crystals for doubling said near-infrared output and using the other pair of said crystals for tripling said near-infrared output for producing a green or UV output with relatively high beam fluence.

30. The laser method of claim 28, including using one pair of said crystals for doubling said near-infrared output and using the other pair of said crystals for quadrupling said near-infrared output for producing a green or UV output with relatively high beam fluence.

31. The laser method of claim 27, wherein said conversion crystal means have angular sensitivity in the sensitive tuning direction and using said conversion crystal means to achieve a factor of "two" reduction in the angular sensitivity of the crystal in the sensitive tuning direction allowing high conversion efficiency for peak powers in the tens to hundreds of megawatts per square centimeter range.

32. The laser method of claim 27, wherein the green or UV output beam is optimized by control of the near infrared input polarization state.

33. The laser method of claim 27, wherein the green or UV output beam is optimized by control of the angular orientation of the conversion crystal in the sensitive tuning direction.

34. The laser method of claim 27, wherein the green or UV output beam is optimized by control of the temperature of the conversion crystals.

* * * * *